(12) United States Patent  
Chen et al.

(10) Patent No.: US 11,227,158 B2
(45) Date of Patent: Jan. 18, 2022

(54) DETAILED EYE SHAPE MODEL FOR ROBUST BIOMETRIC APPLICATIONS

(71) Applicant: Magic Leap, Inc., Plantation, FL (US)

(72) Inventors: Jixu Chen, Sunnyvale, CA (US); Gholamreza Amayeh, Santa Clara, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/719,876

(22) Filed: Dec. 18, 2019

(65) Prior Publication Data

US 2020/0125843 A1 Apr. 23, 2020

Related U.S. Application Data

(63) Continuation of application No. 15/693,975, filed on Sep. 1, 2017, now Pat. No. 10,521,661.

(51) Int. Cl.
*G06K 9/62* (2006.01)
*G06K 9/00* (2006.01)

(52) U.S. Cl.
CPC ....... *G06K 9/00617* (2013.01); *G06K 9/0061* (2013.01); *G06K 9/00604* (2013.01); *G06K 9/00973* (2013.01); *G06K 9/6259* (2013.01)

(58) Field of Classification Search
None
See application file for complete search history.

(56) References Cited

U.S. PATENT DOCUMENTS

| | | | |
|---|---|---|---|
| 5,291,560 A | 3/1994 | Daugman | |
| 6,095,989 A | 8/2000 | Hay et al. | |
| 6,154,559 A | 11/2000 | Beardsley | |
| 6,850,221 B1 | 2/2005 | Tickle | |
| 7,572,008 B2 | 8/2009 | Elvesjo et al. | |
| 7,682,026 B2 | 3/2010 | Huffman et al. | |
| 7,771,049 B2 | 8/2010 | Knaan et al. | |
| 7,970,179 B2 | 6/2011 | Tosa | |
| 8,363,783 B2 | 1/2013 | Gertner et al. | |
| 8,845,625 B2 | 9/2014 | Angeley et al. | |

(Continued)

FOREIGN PATENT DOCUMENTS

| | | |
|---|---|---|
| FR | 2915301 | 10/2008 |
| WO | WO 2014/182769 | 11/2014 |

(Continued)

OTHER PUBLICATIONS

Invitation to Pay Additional Fees and, Where Applicable, Protest Fee for PCT Application No. PCT/US17/49860, dated Oct. 26, 2017.

(Continued)

*Primary Examiner* — Idowu O Osifade
(74) *Attorney, Agent, or Firm* — Knobbe, Martens, Olson & Bear, LLP

(57) ABSTRACT

Systems and methods for robust biometric applications using a detailed eye shape model are described. In one aspect, after receiving an eye image of an eye (e.g., from an eye-tracking camera on an augmented reality display device), an eye shape (e.g., upper or lower eyelids, an iris, or a pupil) of the eye in the eye image is calculated using cascaded shape regression methods. Eye features related to the estimated eye shape can then be determined and used in biometric applications, such as gaze estimation or biometric identification or authentication.

20 Claims, 9 Drawing Sheets

(56) References Cited

U.S. PATENT DOCUMENTS

| | | |
|---|---|---|
| 8,950,867 B2 | 2/2015 | Macnamara |
| 9,081,426 B2 | 7/2015 | Armstrong |
| 9,215,293 B2 | 12/2015 | Miller |
| 9,262,680 B2 | 2/2016 | Nakazawa et al. |
| 9,310,559 B2 | 4/2016 | Macnamara |
| 9,348,143 B2 | 5/2016 | Gao et al. |
| D758,367 S | 6/2016 | Natsume |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,671,566 B2 | 6/2017 | Abovitz et al. |
| 9,740,006 B2 | 8/2017 | Gao |
| 9,791,700 B2 | 10/2017 | Schowengerdt et al. |
| 9,851,563 B2 | 12/2017 | Gao et al. |
| 9,857,591 B2 | 1/2018 | Welch et al. |
| 9,874,749 B2 | 1/2018 | Bradski |
| 10,521,661 B2 | 12/2019 | Chen et al. |
| 2003/0169907 A1 | 9/2003 | Edwards et al. |
| 2006/0028436 A1 | 2/2006 | Armstrong |
| 2006/0147094 A1 | 7/2006 | Yoo |
| 2006/0280340 A1 | 12/2006 | Derakhshani et al. |
| 2007/0081123 A1 | 4/2007 | Lewis |
| 2007/0140531 A1 | 6/2007 | Hamza |
| 2007/0274570 A1 | 11/2007 | Hanna et al. |
| 2008/0002262 A1 | 1/2008 | Chirieleison |
| 2008/0226138 A1 | 9/2008 | Suzuki et al. |
| 2008/0253622 A1 | 10/2008 | Tosa et al. |
| 2009/0310829 A1 | 12/2009 | Baba et al. |
| 2010/0202669 A1 | 8/2010 | Hollingsworth et al. |
| 2011/0150334 A1 | 6/2011 | Du et al. |
| 2011/0280454 A1 | 11/2011 | Su et al. |
| 2012/0127062 A1 | 5/2012 | Bar-Zeev et al. |
| 2012/0162549 A1 | 6/2012 | Gao et al. |
| 2012/0163678 A1 | 6/2012 | Du et al. |
| 2012/0219189 A1 | 8/2012 | Wu et al. |
| 2013/0082922 A1 | 4/2013 | Miller |
| 2013/0117377 A1 | 5/2013 | Miller |
| 2013/0125027 A1 | 5/2013 | Abovitz |
| 2013/0169530 A1 | 7/2013 | Bhaskar et al. |
| 2013/0208234 A1 | 8/2013 | Lewis |
| 2013/0242262 A1 | 9/2013 | Lewis |
| 2013/0266195 A1* | 10/2013 | Shiell ............... G06K 9/621 382/118 |
| 2013/0322810 A1 | 12/2013 | Robbins |
| 2014/0023240 A1 | 1/2014 | Venkatesha et al. |
| 2014/0071539 A1 | 3/2014 | Gao |
| 2014/0133705 A1 | 5/2014 | Hanita et al. |
| 2014/0147022 A1 | 5/2014 | Zhou et al. |
| 2014/0161317 A1 | 6/2014 | Hiramaki et al. |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2014/0267771 A1 | 9/2014 | Lawler |
| 2014/0270405 A1 | 9/2014 | Derakhshani et al. |
| 2014/0300867 A1 | 10/2014 | Fassi et al. |
| 2014/0306866 A1 | 10/2014 | Miller et al. |
| 2014/0355841 A1 | 12/2014 | Santos-Villalobos et al. |
| 2015/0016777 A1 | 1/2015 | Abovitz et al. |
| 2015/0103306 A1 | 4/2015 | Kaji et al. |
| 2015/0134583 A1 | 5/2015 | Tamatsu et al. |
| 2015/0178939 A1 | 6/2015 | Bradski et al. |
| 2015/0199008 A1 | 7/2015 | Kim et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0268415 A1 | 9/2015 | Schowengerdt et al. |
| 2015/0278642 A1 | 10/2015 | Chertok et al. |
| 2015/0301599 A1 | 10/2015 | Miller |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0034811 A1 | 2/2016 | Paulik et al. |
| 2016/0098844 A1 | 4/2016 | Shaji et al. |
| 2016/0104053 A1 | 4/2016 | Yin et al. |
| 2016/0196465 A1 | 7/2016 | Wu et al. |
| 2016/0202756 A1* | 7/2016 | Wu .................. G06F 3/013 382/103 |
| 2016/0269411 A1 | 9/2016 | Malachi |
| 2017/0053165 A1 | 2/2017 | Kaehler |
| 2017/0053166 A1 | 2/2017 | Amayeh et al. |
| 2017/0109580 A1 | 4/2017 | Kaehler et al. |
| 2017/0352135 A1* | 12/2017 | Florea ............... H04N 5/23229 |
| 2017/0364732 A1* | 12/2017 | Komogortsev .... G06K 9/00604 |
| 2018/0039846 A1* | 2/2018 | Grubb ............... G06K 9/00597 |
| 2018/0137335 A1 | 5/2018 | Kim et al. |
| 2018/0137337 A1 | 5/2018 | Zeng et al. |
| 2018/0173986 A1* | 6/2018 | Gousev .............. G06K 9/00617 |
| 2018/0300589 A1* | 10/2018 | Levinshtein ........... G06F 3/012 |
| 2019/0034706 A1* | 1/2019 | el Kaliouby ......... H04N 21/266 |
| 2019/0073533 A1 | 3/2019 | Chen et al. |
| 2019/0244010 A1* | 8/2019 | Kim .................. G06K 9/00208 |
| 2019/0362144 A1* | 11/2019 | Chen ...................... A61B 3/14 |
| 2019/0392145 A1* | 12/2019 | Komogortsev ......... G06F 21/32 |
| 2020/0110952 A1* | 4/2020 | Gleeson-May .... G06K 9/00281 |
| 2020/0175262 A1* | 6/2020 | Pitre .................. G06K 9/00228 |
| 2020/0219295 A1* | 7/2020 | el Kaliouby ....... G06K 9/00302 |

FOREIGN PATENT DOCUMENTS

| | | |
|---|---|---|
| WO | WO 2016/018488 | 2/2016 |
| WO | WO 2017/034860 | 3/2017 |
| WO | WO 2017/034861 | 3/2017 |
| WO | WO 2017/066296 | 4/2017 |
| WO | WO 2019/045750 | 3/2019 |

OTHER PUBLICATIONS

International Search Report and Written Opinion for PCT Application No. PCT/US17/49860, dated Jan. 5, 2018.

"Feature Extraction Using Convolution", Ufldl, printed Sep. 1, 2016, in 3 pages. URL:http://deeplearning.stanford.edu/wiki/index.php/Feature_extraction_using_convolution.

"Machine Learning", Wikipedia, printed Oct. 3, 2017, in 14 pages. URL: https://en.wikipedia.org/wiki/Machine_learning.

Alonso-Fernandez, F. et al., "Iris Recognition Based on SIFT Features", ATVS, Universidad Autonoma de Madrid, Spain, Sep. 2009, in 28 pages.

Anthony, S., "MIT releases open-source software that reveals invisible motion and detail in video", Extreme Tech, Feb. 28, 2013, as accessed Aug. 4, 2017, in 5 pages.

Aubry M. et al., "Seeing 3D chairs: exemplar part-based 2D-3D alignment using a large dataset of CAD models", Proceedings of the IEEE Conference on Computer Vision and Pattern Recognition (Jun. 23-28, 2014); Computer Vision Foundation—Open Access Version in 8 pages.

Cao, X. et al., "Face Alignment by Explicit Shape Regression" International Journal of Computer Vision, Dec. 2013, in 14 pages.

Carreira J. et al., "Human Pose Estimation with Iterative Error Feedback", In Proceedings of the IEEE Conference on Computer Vision and Pattern Recognition, Jun. 27-30, 2016, pp. 4733-4742.

Choy et al., "3D-R2N2: A Unified Approach for Single and Multi-view 3D Object Reconstruction", arXiv; e-print arXiv:1604.00449v1, Apr. 2, 2016 in 17 pages.

Collet et al., "The MOPED framework: Object Recognition and Pose Estimation for Manipulation", The International Journal of Robotics Research. (Sep. 2011) 30(10):1284-306; preprint Apr. 11, 2011 in 22 pages.

Dai J. et al., "Instance-aware Semantic Segmentation via Multi-task Network Cascades", In *Proceedings of the IEEE Conference on Computer Vision and Pattern Recognition*; Jun. 27-30, 2016 (pp. 3150-3158).

Daugman, J. et al., "Epigenetic randomness, compleity and singularity of human iris patterns", Proceedings of Royal Society: Biological Sciences, vol. 268, Aug. 22, 2001, in 4 pages.

(56) References Cited

OTHER PUBLICATIONS

Daugman, J., "How Iris Recognition Works", IEEE Transactions on Circuits and Systems for Video Technology, vol. 14, No. 1, Jan. 2004, in 10 pages.
Daugman, J., "New Methods in Iris Recognition," IEEE Transactions on Systems, Man, and Cybernetics—Part B: Cybernetics, vol. 37, No. 5, Oct. 2007, in 9 pages.
Derpanis, K., "Overview of the RANSAC Algorithm", dated May 13, 2010, in 2 pages.
Dollar, P. et al., "Cascaded Pose Regression", IEEE Conference on Computer Vision and Pattern Recognition, Jun. 2010, in 8 pages. URL: https://pdollar.github.io/files/papers/DollarCVPR10pose.pdf.
Everingham M. et al., "The PASCAL Visual Object Classes (VOC) Challenge", Int J Comput Vis (Jun. 2010) 88(2):303-38.
Hansen, D. et al., "In the Eye of the Beholder: A Survey of Models for Eyes and Gaze", IEEE Transactions on Pattern Analysis and Machine Intelligence, vol. 32, No. 3, Mar. 2010, in 23 pages.
Kar A. et al., "Category-specific object reconstruction from a single image", in *Proceedings of the IEEE Conference on Computer Vision and Pattern Recognition*. Jun. 7-12, 2015 (pp. 1966-1974).
Kazemi, V. et al., "One Millisecond Face Alignment with an Ensemble of Regression Trees", IEEE Conference on Computer Vision and Pattern Recognition, Jun. 2014, in 8 pages. URL: https://www.cv-foundation.org/openaccess/content_cvpr_2014/papers/Kazemi_One_Millisecond_Face_2014_CVPR_paper.pdf.
Li, D. et al., "Starburst: A hybrid algorithm for video-based eye tracking combining feature-based and model-based approaches", IEEE CVPR Workshop on V4HCI, Jun. 2005, in 8 pages.
Rublee, E. et al., "ORB: an efficient alternative to SIFT or SURF", Menlo Park, California, Nov. 2011, in 8 pages.
Wikipedia: "Deep Learning", Wikipedia, printed Apr. 27, 2016, in 40 pages. URL: https://en.wikipedia.org/wiki/Deep_learning#Deep_neural_networks.
Wikipedia: "Deep Learning", Wikipedia, printed Oct. 3, 2017, in 23 pages. URL: https://en.wikipedia.org/wiki/Deep_learning.
Xiang Y. et al., "Data-Driven 3D Voxel Patterns for Object Category Recognition", in Proceedings of the IEEE Conference on Computer Vision and Pattern Recognition, Jun. 7-12, 2015 (pp. 1903-1911).
Xiao J. et al., "Localizing 3D cuboids in single-view images", in Advances in Neural Information Processing Systems 25. F. Pereira et al. [Eds.] Dec. 2012 (pp. 746-754).
International Preliminary Report on Patentability and Written Opinion for PCT Application No. PCT/US17/49860, dated Mar. 3, 2020.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Pang, et al., "Robust Eye Center Localization through Face Alignment and Invariant Isocentric Patterns," PLoS One 10(10); e0139098, doi:10. 1371/journal. Published Oct. 1, 2015.
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

\* cited by examiner

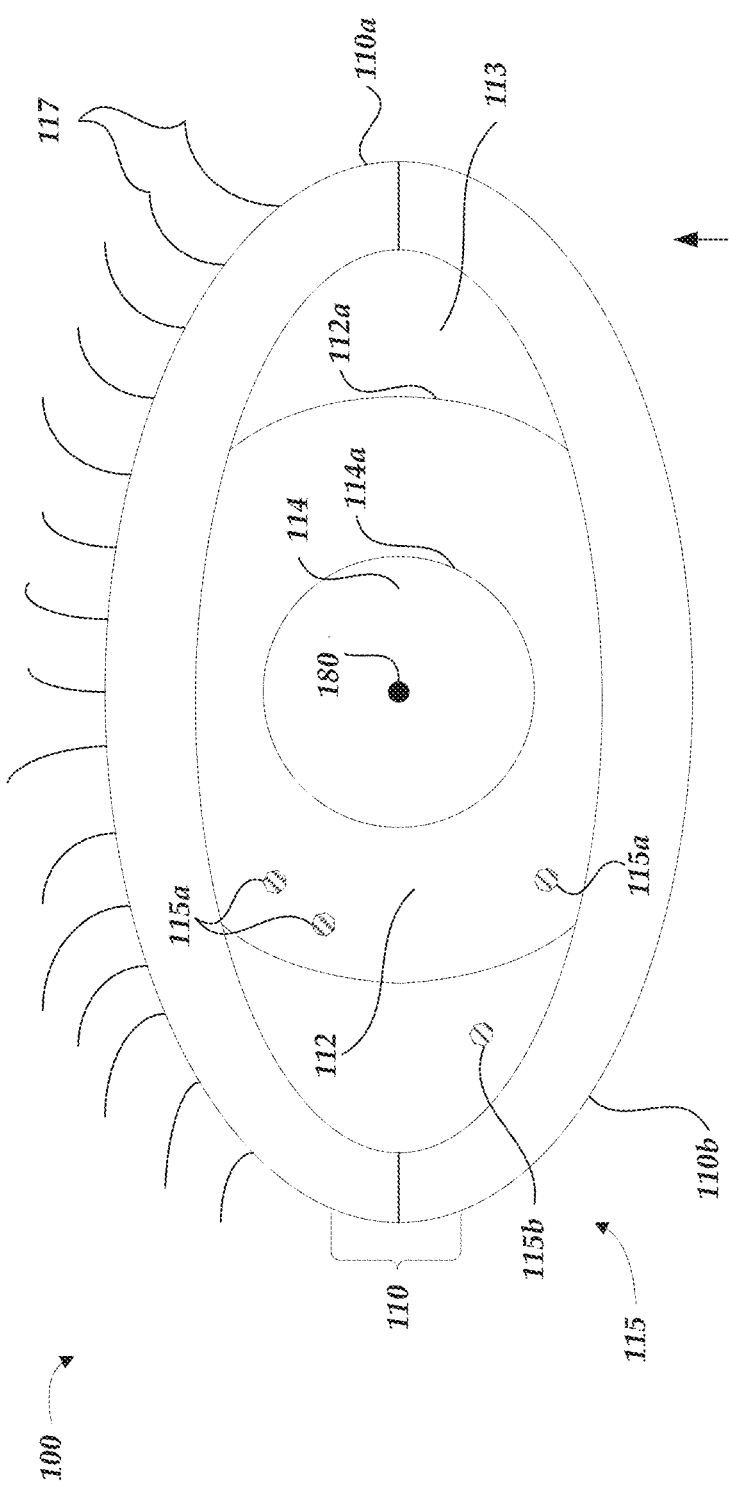
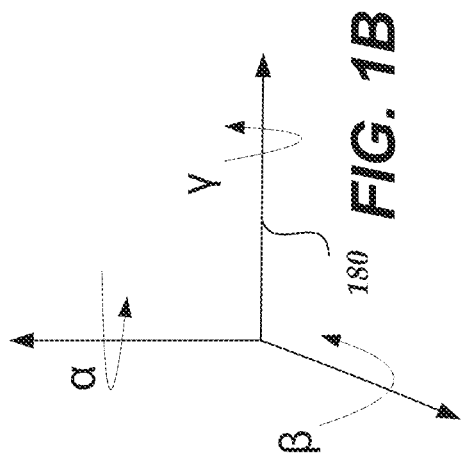
FIG. 1A
FIG. 1B

DETAILED EYE SHAPE MODEL FOR ROBUST BIOMETRIC APPLICATIONS

PRIORITY CLAIM

This application is a continuation of U.S. application Ser. No. 15/693,975, filed Sep. 1, 2017, entitled "DETAILED EYE SHAPE MODEL FOR ROBUST BIOMETRIC APPLICATIONS," which is incorporated by reference herein in its entirety.

BACKGROUND

Field

The present disclosure relates generally to systems and methods for processing eye imagery and more particularly for estimating a detailed eye shape model, comprising the pupil, iris, or eyelid using cascaded shape regression.

Description of the Related Art

The human iris of an eye can be used as a source of biometric information. Biometric information can provide authentication or identification of an individual. Biometric information can additionally or alternatively be used to determine a gaze direction for the eye.

SUMMARY

Systems and methods for robust biometric applications using a detailed eye shape model are described. In one aspect, after receiving an eye image of an eye (e.g., from an eye-tracking camera on an augmented reality display device), an eye shape (e.g., a shape of an upper or lower eyelid, an iris, or a pupil) of the eye in the eye image is calculated using cascaded shape regression methods. Eye features related to the estimated eye shape can then be determined and used in biometric applications, such as gaze estimation or biometric identification or authentication (e.g., iris codes). The cascaded shape regression method can be trained on a set of annotated eye images that label, for example, the shape of the eyelids, pupil, and iris.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 1A schematically illustrates an example of an eye showing eye features.

FIG. 1B shows an example of three angles (e.g., yaw, pitch, and roll) that can be used for measuring eye pose direction relative to a natural, resting state of the eye.

Figure 2A:
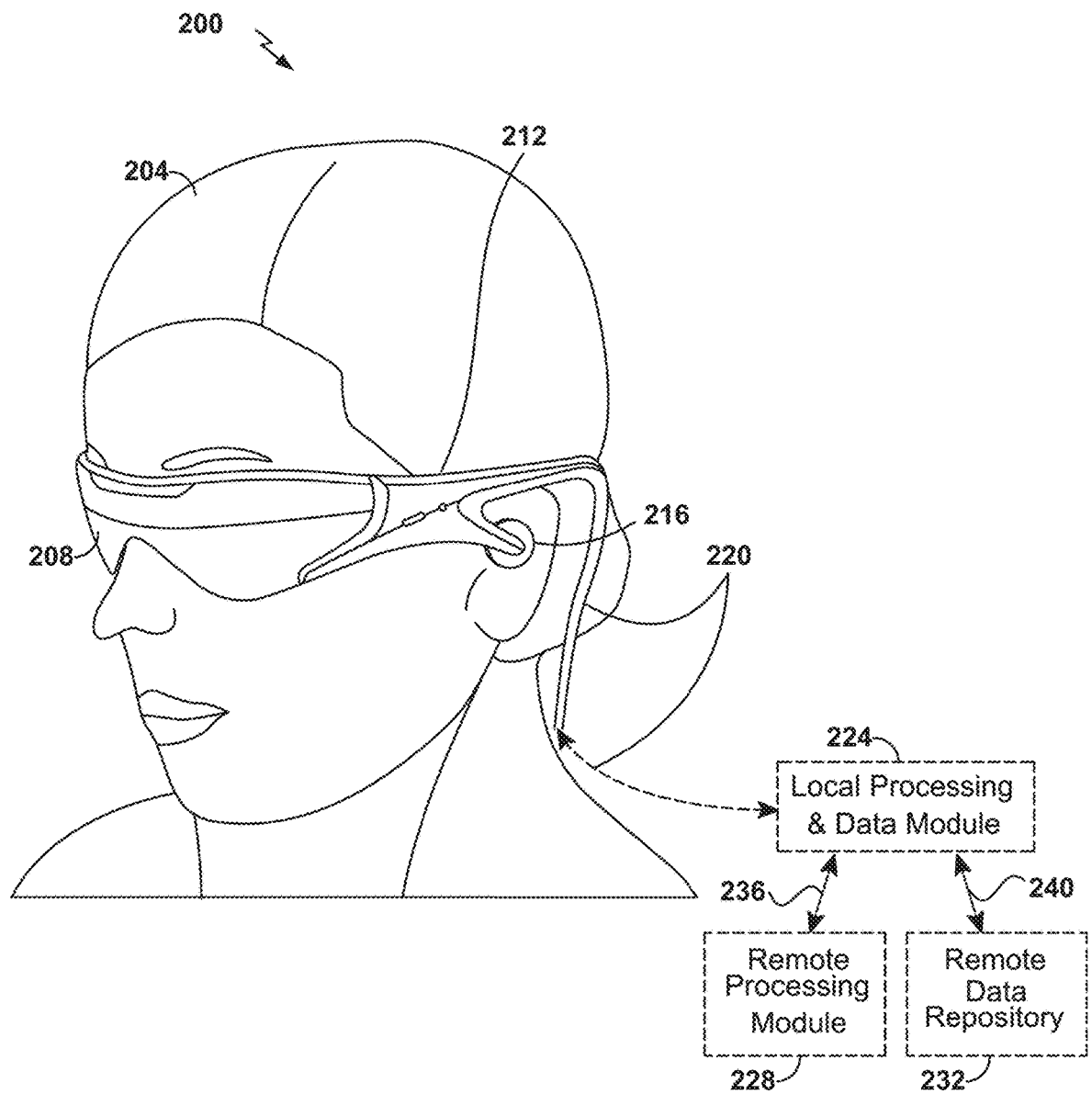
FIG. 2A schematically illustrates an example of a wearable display system.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Extracting biometric information from the eye generally includes a procedure for the segmentation of the iris within an eye image. Iris segmentation can involve operations including locating the iris boundaries, including finding the pupillary and limbic boundaries of the iris, localizing upper or lower eyelids if they occlude the iris, detecting and excluding occlusions of eyelashes, shadows, or reflections, and so forth. For example, the eye image can be included in an image of the face or may be an image of the periocular region. To perform iris segmentation, both the boundary of the pupil (the interior boundary of the iris) and the limbus (the exterior boundary of the iris) can be identified as separate segments of image data. In addition to this segmentation of the iris, the portion of the iris that is occluded by the eyelids (upper or lower) can be estimated. This estimation is performed because, during normal human activity, the entire iris of a person is rarely visible. In other words, the entire iris is not generally free from occlusions of the eyelids (e.g., during blinking).

Eyelids may be used by the eye to keep the eye moist, for example, by spreading tears and other secretions across the eye surface. Eyelids may also be used to protect the eye from foreign debris. As an example, the blink reflex protects the eye from acute trauma. As another example, even when the eye is actively viewing the world, the eyelids may protect the eye, for example, by moving automatically in response to changes in the pointing direction of the eye. Such movement by the eyelids can maximize protection of the eye surface while avoiding occlusion of the pupil. However, this movement presents further challenges when extracting biometric information with iris-based biometric measurements such as iris segmentation. For example, to use iris segmentation, the areas of the iris that are occluded by the eyelids may be estimated and masked from identity verification computations or images taken during eyelid blink may be discarded or given lower weight during analysis.

Extracting biometric information has presented challenges, such as estimating the portion of the iris occluded by eyelids. However, using the techniques described herein, the challenges presented in extracting biometric information can be mitigated by first estimating the eye shape. As used herein, the eye shape includes one or more of a shape (e.g., a boundary) of the pupil, iris, upper eyelid, or lower eyelid. This estimation of eye shape can be used as a starting point for iris segmentation. Once the eye shape is estimated, biometric applications may be performed more efficiently and more robustly. For instance, corneal reflections (e.g., glints) found in certain regions of the eye (e.g., the iris) may be used for gaze estimation. Glints in other regions of the eye (e.g., the sclera) are often not used in eye gaze estimation. By calculating a detailed eye shape model using the techniques described herein, glints in the desired regions (e.g., iris) can be located more quickly and efficiently by removing the need to search the entire eye (e.g., iris and sclera), thus producing a more efficient and robust gaze estimation.

To obtain biometric information, algorithms exist for tracking eye movements of a user of a computer. For example, a camera coupled to a monitor of the computer can provide images for identifying eye movements. However, the cameras used for eye tracking are some distance from the eyes of the user. For example, the camera may be placed at the top of a user's monitor coupled to the computer. As a result, the images of the eyes produced by the camera are, often, produced with poor resolution and at differing angles. Accordingly, extracting biometric information from a captured eye image may present challenges.

In the context of a wearable head mounted display (HMD), cameras may be closer to the user's eyes than a camera coupled to a user's monitor. For example, cameras may be mounted on the wearable HMD, which itself is placed on a user's head. The proximity of the eyes to such a camera can result in higher resolution eye imagery. Accordingly, it is possible for computer vision techniques to extract visual features from the user's eyes, particularly at the iris (e.g., an iris feature) or in the sclera surrounding the iris (e.g., a scleral feature). For example, when viewed by a camera near the eye, the iris of an eye will show detailed structures. Such iris features are particularly pronounced when observed under infrared (IR) illumination and can be used for biometric applications, such as gaze estimation or biometric identification. These iris features are unique from user to user and, in the manner of a fingerprint, can be used to identify the user uniquely. Eye features can include blood vessels in the sclera of the eye (outside the iris), which may also appear particularly pronounced when viewed under red or infrared light. Eye features may further include glints and the center of the pupil.

With the techniques disclosed herein, detailed eye shape estimation is used to produce a more robust method of detecting eye features used in biometric applications (e.g., gaze estimation and biometric identification). The use of gaze estimation has significant implications on the future of computer interfaces. Gaze estimation is currently employed in active interfaces (e.g., an interface that receives instructions through eye movements) and passive interfaces (e.g., a virtual reality device that modifies the display based on gaze position). Detecting eye features using conventional eye shape estimation techniques is challenging because of image noise, ambient light, and large variations in appearance when the eye is half-closed or blinking. Therefore, a method of producing a more robust algorithm for determining eye features used in biometric applications, such as gaze estimation or biometric identification, would be advantageous. The following disclosure describes such a method.

The present disclosure will describe a detailed eye shape model calculated using cascaded shape regression techniques, as well as ways that the detailed eye shape model may be used for robust biometric applications. Recently, shape regression has become the state-of-the-art approach for accurate and efficient shape alignment. It has been successfully used in face, hand and ear shape estimation. Regression techniques are advantageous because, for example, they are capable of capturing large variances in appearance; they enforce shape constraint between landmarks (e.g., iris between eyelids, pupil inside iris); and they are computationally efficient.

As used herein, video is used in its ordinary sense and includes, but is not limited to, a recording of a sequence of visual images. Each image in a video is sometimes referred to as an image frame or simply a frame. A video can include a plurality of sequential frames or non-sequential frames, either with or without an audio channel. A video can include a plurality of frames, which are ordered in time or which are not ordered in time. Accordingly, an image in a video can be referred to as an eye image frame or eye image.

Example of an Eye Image

FIG. 1A illustrates an image of an eye 100 with eyelids 110, iris 112, and pupil 114. Curve 114a shows the pupillary boundary between the pupil 114 and the iris 112, and curve 112a shows the limbic boundary between the iris 112 and the sclera 113 (the "white" of the eye). The eyelids 110 include an upper eyelid 110a and a lower eyelid 110b and eyelashes 117. The eye 100 is illustrated in a natural resting pose (e.g., in which the user's face and gaze are both oriented as they would be toward a distant object directly ahead of the user). The natural resting pose of the eye 100 can be indicated by a natural resting direction 180, which can be a direction orthogonal to the surface of the eye 100 when in the natural resting pose (e.g., directly out of the plane for the eye 100 shown in FIG. 1A) and in this example, centered within the pupil 114.

The eye 100 can include eye features 115 in the iris or the sclera (or both) that can be used for biometric applications, such as eye tracking. FIG. 1A illustrates an example of eye features 115 including iris features 115a and a scleral feature 115b. Eye features 115 can be referred to as individual keypoints. Such eye features 115 may be unique to an individual's eye, and may be distinct for each eye of that individual. An iris feature 115a can be a point of a particular color density, as compared to the rest of the iris color, or as compared to a certain area surrounding that point. As another example, a texture (e.g., a texture that is different from texture of the iris nearby the feature) or a pattern of the iris can be identified as an iris feature 115a. As yet another example, an iris feature 115a can be a scar that differs in appearance from the iris 112. Eye features 115 can also be associated with the blood vessels of the eye. For example, a blood vessel may exist outside of the iris 112 but within the sclera 113. Such blood vessels may be more prominently visible under red or infrared light illumination. The scleral feature 115b can be a blood vessel in the sclera of the eye. Additionally or alternatively, eye features 115 may comprise glints, which comprise corneal reflections of light sources (e.g., an IR light source directed toward the eye for gaze tracking or biometric identification). In some cases, the term eye feature may be used to refer to any type of identifying feature in or on the eye, whether the feature is in the iris 112, the sclera 113, or a feature seen through the pupil 114 (e.g., on the retina).

Each eye feature 115 can be associated with a descriptor that is a numerical representation of an area surrounding the eye feature 115. A descriptor can also be referred to as an iris feature representation. As yet another example, such eye features may be derived from scale-invariant feature transforms (SIFT), speeded up robust features (SURF), features from accelerated segment test (FAST), oriented FAST and rotated BRIEF (ORB), KAZE, Accelerated KAZE (AKAZE), etc. Accordingly, eye features 115 may be derived from algorithms and techniques from the field of computer vision known. Such eye features 115 can be referred to as keypoints. In some of the example embodiments described below, the eye features will be described in terms of iris features. This is not a limitation and any type of eye feature (e.g., a scleral feature) can be used, additionally or alternatively, in other implementations.

As the eye 100 moves to look toward different objects, the eye gaze (sometimes also referred to herein as eye pose) will change relative to the natural resting direction 180. The current eye gaze can be measured with reference the natural resting eye gaze direction 180. The current gaze of the eye 100 may be expressed as three angular parameters indicating the current eye pose direction relative to the natural resting direction 180 of the eye. For purposes of illustration, and with reference to an example coordinate system shown in FIG. 1B, these angular parameters can be represented as α (may be referred to as yaw), β (may be referred to as pitch), and γ (may be referred to as roll). In other implementations, other techniques or angular representations for measuring eye gaze can be used, for example, any other type of Euler angle system.

An eye image can be obtained from a video using any appropriate process, for example, using a video processing algorithm that can extract an image from one or more sequential frames. The pose of the eye can be determined from the eye image using a variety of eye-tracking techniques. For example, an eye pose can be determined by considering the lensing effects of the cornea on light sources that are provided or by calculating a shape of the pupil or iris (relative to a circular shape representing a forward-looking eye).

Example of a Wearable Display System Using Eye Shape Estimation

In some embodiments, display systems can be wearable, which may advantageously provide a more immersive virtual reality (VR), augmented reality (AR), or mixed reality (MR) experience, where digitally reproduced images or portions thereof are presented to a wearer in a manner wherein they seem to be, or may be perceived as, real.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. For example, displays containing a stack of waveguides may be configured to be worn positioned in front of the eyes of a user, or viewer. The stack of waveguides may be utilized to provide three-dimensional perception to the eye/brain by using a plurality of waveguides to direct light from an image injection device (e.g., discrete displays or output ends of a multiplexed display which pipe image information via one or more optical fibers) to the viewer's eye at particular angles (and amounts of divergence) corresponding to the depth plane associated with a particular waveguide.

In some embodiments, two stacks of waveguides, one for each eye of a viewer, may be utilized to provide different images to each eye. As one example, an augmented reality scene may be such that a wearer of an AR technology sees a real-world park-like setting featuring people, trees, buildings in the background, and a concrete platform. In addition to these items, the wearer of the AR technology may also perceive that he "sees" a robot statue standing upon the real-world platform, and a cartoon-like avatar character flying by which seems to be a personification of a bumble bee, even though the robot statue and the bumble bee do not exist in the real world. The stack(s) of waveguides may be used to generate a light field corresponding to an input image and in some implementations, the wearable display comprises a wearable light field display. Examples of wearable display device and waveguide stacks for providing light field images are described in U.S. Patent Publication No. 2015/0016777, which is hereby incorporated by reference herein in its entirety for all it contains.

Figure 2B:
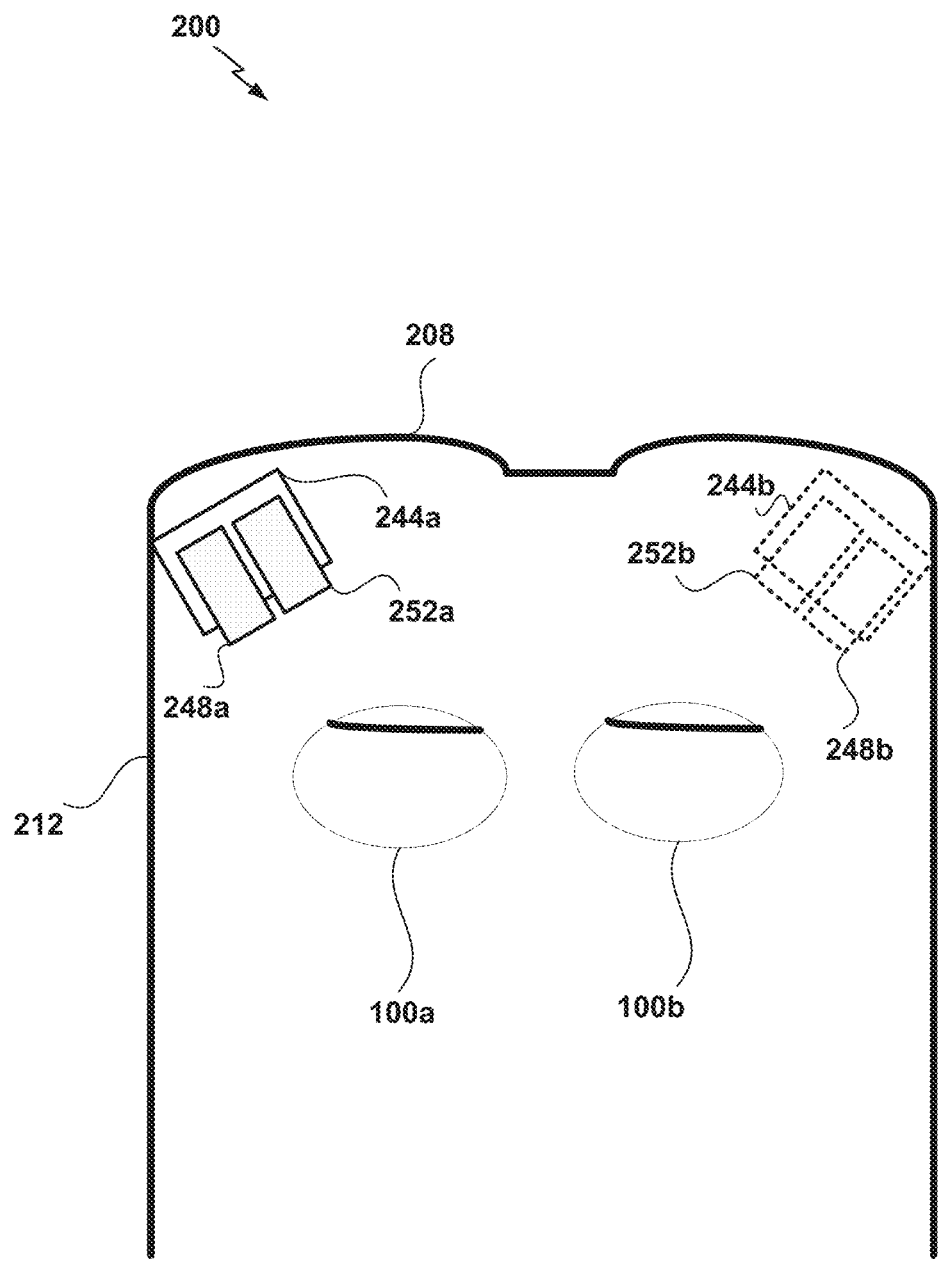
FIG. 2B schematically illustrates a top view of an example of the wearable display system.

FIGS. 2A and 2B illustrate examples of a wearable display system 200 that can be used to present a VR, AR, or MR experience to the wearer 204. The wearable display system 200 may be programmed to capture an image of an eye and perform eye shape estimation to provide any of the applications or embodiments described herein. The display system 200 includes a display 208 (positionable in front of the user's eye or eyes), and various mechanical and electronic modules and systems to support the functioning of that display 208. The display 208 may be coupled to a frame 212, which is wearable by a display system wearer or viewer 204 and which is configured to position the display 208 in front of the eyes of the wearer 204. The display 208 may be a light field display, configured to display virtual images at multiple depth planes from the user. In some embodiments, a speaker 216 is coupled to the frame 212 and positioned adjacent the ear canal of the user in some embodiments, another speaker, not shown, is positioned adjacent the other ear canal of the user to provide for stereo/shapeable sound control. The display 208 is operatively coupled 220, such as by a wired lead or wireless connectivity, to a local data processing module 224 which may be mounted in a variety of configurations, such as fixedly attached to the frame 212, fixedly attached to a helmet or hat worn by the user, embedded in headphones, or otherwise removably attached to the user 204 (e.g., in a backpack-style configuration, in a belt-coupling style configuration).

As shown in FIG. 2B, the wearable display system 200 may further include an eye tracking camera 252a disposed within the wearable display system 200 and configured to capture images of an eye 100a. The display system 200 may further comprise a light source 248a configured to provide sufficient illumination to capture eye features 115 of the eye 100a with the eye tracking camera 252a. In some embodiments, the light source 248a illuminates the eye 100a using infrared light, which is not visible to the user, so that the user is not distracted by the light source. The eye tracking camera 252a and light source 248a may be separate components that are individually attached to the wearable display system 200, for instance to the frame 212. In other embodiments, the eye tracking camera 252a and light source 248a may be components of a single housing 244a that is attached to the frame 212. In some embodiments, the wearable display system 200 may further comprise a second eye tracking camera 252b and a second light source 248b configured to illuminate and capture images of eye 100b. The eye tracking cameras 252a, 252b can be used to capture the eye images used in eye shape calculation, gaze determination, and biometric identification.

Referring again to FIG. 2A, the local processing and data module 224 may comprise a hardware processor, as well as non-transitory digital memory, such as non-volatile memory e.g., flash memory, both of which may be utilized to assist in the processing, caching, and storage of data. The data include data (a) captured from sensors (which may be, e.g., operatively coupled to the frame 212 or otherwise attached to the wearer 204), such as image capture devices (such as cameras), microphones, inertial measurement units, accelerometers, compasses, GPS units, radio devices, and/or gyros; and/or (b) acquired and/or processed using remote processing module 228 and/or remote data repository 232, possibly for passage to the display 208 after such processing or retrieval. The local processing and data module 224 may be operatively coupled by communication links 236, 240, such as via a wired or wireless communication links, to the remote processing module 228 and remote data repository 232 such that these remote modules 228, 232 are operatively coupled to each other and available as resources to the local processing and data module 224.

In some embodiments, the remote processing module 228 may comprise one or more processors configured to analyze and process data and/or image information such as video information captured by an image capture device. The video data may be stored locally in the local processing and data module 224 and/or in the remote data repository 232. In some embodiments, the remote data repository 232 may comprise a digital data storage facility, which may be available through the internet or other networking configuration in a "cloud" resource configuration. In some embodiments, all data is stored and all computations are performed in the local processing and data module 224, allowing fully autonomous use from a remote module. In some implementations, the local processing and data module 224 and/or the remote processing module 228 are programmed to perform embodiments of estimating a detailed eye shape model as described herein. For example, the local processing and data module 224 or the remote processing module 228 can be programmed to perform embodiments of routine 300 described with reference to FIG. 3 below. The local processing and data module 224 or the remote processing module 228 can be programmed to use eye shape estimation techniques disclosed herein to perform biometric applications, for example to identify or authenticate the identity of the wearer 204. Additionally or alternatively, in gaze estimation or pose determination, for example to determine a direction toward which each eye is looking.

An image capture device can capture video for a particular application (e.g., video of the wearer's eye for an eye-tracking application or video of a wearer's hand or finger for a gesture identification application). The video can be analyzed using the eye shape estimation techniques by one or both of the processing modules 224, 228. With this analysis, processing modules 224, 228 can perform eye shape estimation for robust biometric applications. As an example, the local processing and data module 224 and/or the remote processing module 228 can be programmed to store obtained eye images from the eye tracking cameras 252a, 252b attached to the frame 212. In addition, the local processing and data module 224 and/or the remote processing module 228 can be programmed to process the eye images using the eye shape estimation techniques described herein (e.g., the routine 300) to extract biometric information of the wearer 204 of the wearable display system 200. In some cases, off-loading at least some of the biometric information to a remote processing module (e.g., in the "cloud") may improve efficiency or speed of the computations. Various parameters for eye gaze identification (e.g., weights, bias terms, random subset sampling factors, number, and size of filters (e.g., Sobel derivative operator), etc.) can be stored in data modules 224 or 228.

The results of the video analysis (e.g., detailed eye shape model) can be used by one or both of the processing modules 224, 228 for additional operations or processing. For example, in various applications, biometric identification, eye-tracking, recognition, or classification of objects, poses, etc. may be used by the wearable display system 200. For example, video of the wearer's eye(s) can be used for eye shape estimation, which, in turn, can be used by the processing modules 224, 228 to determine the direction of the gaze of the wearer 204 through the display 208. The processing modules 224, 228 of the wearable display system 200 can be programmed with one or more embodiments of eye shape estimation to perform any of the video or image processing applications described herein.

Example Eye Shape Estimation Routine

Figure 3:
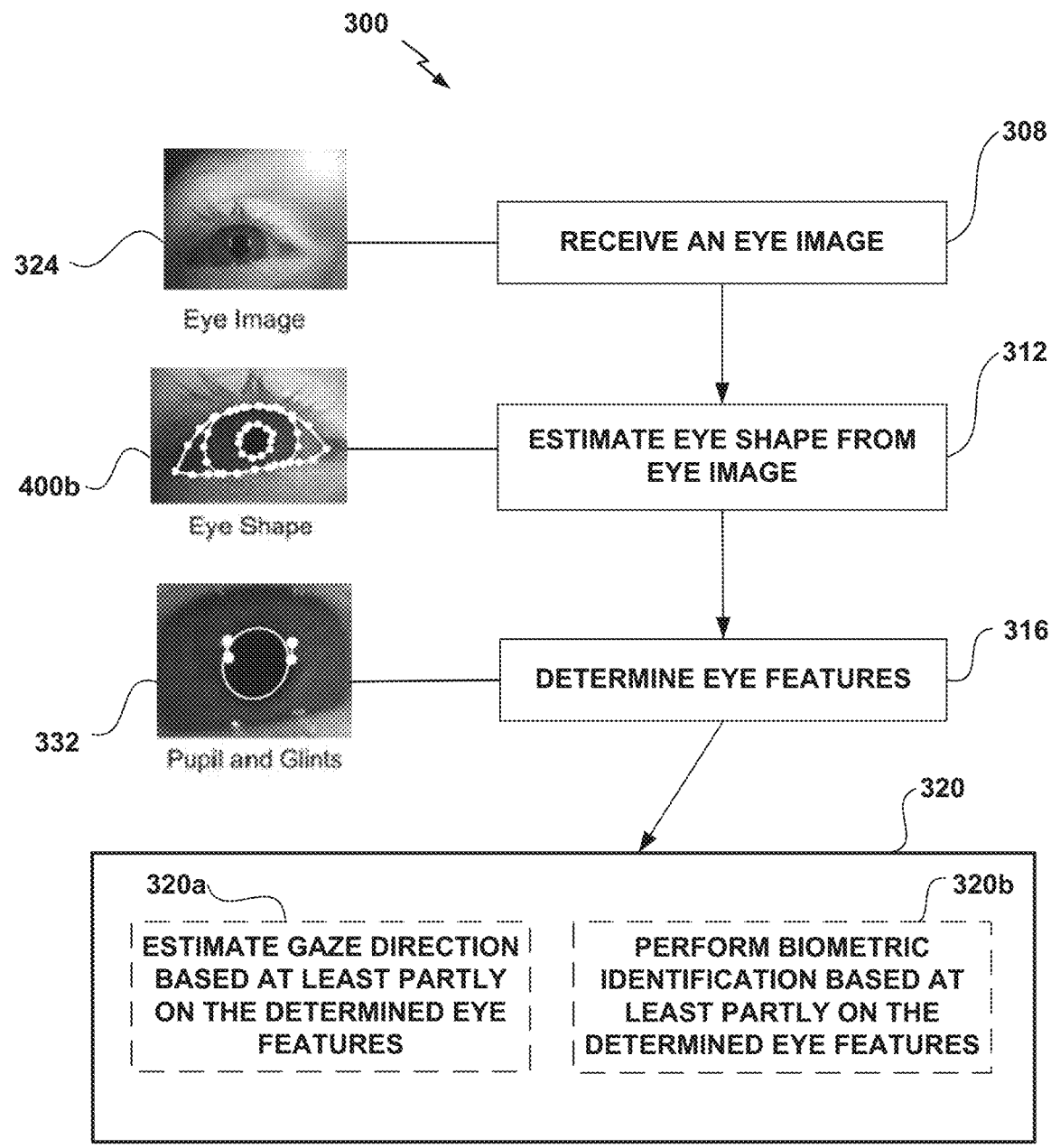
FIG. 3 is a flow diagram of an example routine for extracting biometric information from an eye image to be used in biometric applications.

FIG. 3 is a flow diagram of an example eye shape estimation routine 300. The eye shape estimation routine 300 can be implemented by the local processing and data module 224 or the remote processing module 228 and data repository 232 described with reference to FIG. 2. Eye shape estimation can also be referred to as eye shape detection or detailed eye shape modelling. The routine 300 begins at block 308 when an eye image 324 is received. The eye image 324 can be received from a variety of sources including, for example, an image capture device, a head mounted display system, a server, a non-transitory computer-readable medium, or a client computing device (e.g., a smartphone). The eye image 324 may be received from the eye tracking camera 252a. In some implementations, the eye image 324 can be extracted from a video.

At block 312, a detailed eye shape model 400b may be estimated from the eye image 324. In some embodiments, the detailed eye shape model 400b may be estimated using cascaded shape regression as further described below. At block 316, eye features 115 are determined based at least in part on the detailed eye shape model 400b estimated in block 312. In some embodiments, eye features 115 (some of which are shown in image 332) include pupillary or limbic boundaries, eyelid boundaries, glints, eye keypoints, or a center of the pupil 114. Eye features 115 may further include any feature that can be used in a biometric application. The detailed eye shape model 400b estimated in block 312 may serve as prior knowledge to improve the robustness of the feature detection at block 316. At block 320, a biometric application (e.g., gaze estimation or biometric identification/authentication) is performed based at least in part on the biometric information obtained at blocks 312 and 316. In some embodiments, at block 320a, gaze direction may be estimated based at least in part on the eye features 115 determined at block 316. Additionally or alternatively, in some embodiments, at block 320b, biometric identification/authentication may be performed based at least in part on the eye features determined at block 316. Biometric identification or authentication may comprise determining an iris code based at least in part on the eye image and the determined pupillary and limbic boundaries (e.g., the iris code based on the Daugman algorithm).

Example Eye Shape Estimation

Given an input image I, with an initial eye shape $S_0$, cascaded shape regression progressively refines a shape S by estimating a shape increment $\Delta S$ stage-by-stage. The initial shape $S_0$ may represent a best guess to the eye shape (e.g., pupillary, limbic, and eyelid boundaries) or a default shape (e.g., circular pupillary and iris boundaries centered at the center of the eye image I). In a generic form, a shape increment $\Delta S_t$ at stage t is regressed as:

$$\Delta S_t = f_t(\Phi_t(I, S_{t-1})) \qquad \text{Eq. (1)}$$

where $f_t$ is a regression function at stage t and $\Phi_t$ is a shape-indexed extraction function. Note that $\Phi_t$ can depend on both the input image I and shape in the previous stage $S_{t-1}$. The shape-indexed extraction function $\Phi_t$ can handle larger shape variations compared to a "non-shape-indexed" feature. A pairwise pixel comparison feature may be used, which may be invariant to global illumination changes. The regression goes to the next stage t+1 by adding the shape increment $\Delta S_t$ to the shape in the previous stage $S_{t-1}$ to yield $S_t = S_{t-1} + \Delta S_t$.

Some examples of cascaded shape regression models that can be used to estimate an eye shape can include: Explicit Shape Regression (ESR), Cascaded Pose Regression (CPR), Ensemble of Regression Trees (ERT), Supervised Descent Method (SDM), Local Binary Features (LBF), Probabilistic Random Forests (PRF), Cascade Gaussian Process Regression Trees (cGPRT), Coarse-to-Fine Shape Searching (CFSS), Random Cascaded Regression Copse (R-CR-C), Cascaded Collaborative Regression method (CCR), Spatio-Temporal Cascade Shape Regression (STCSR), or other cascaded shape regression methods.

Figure 4A:
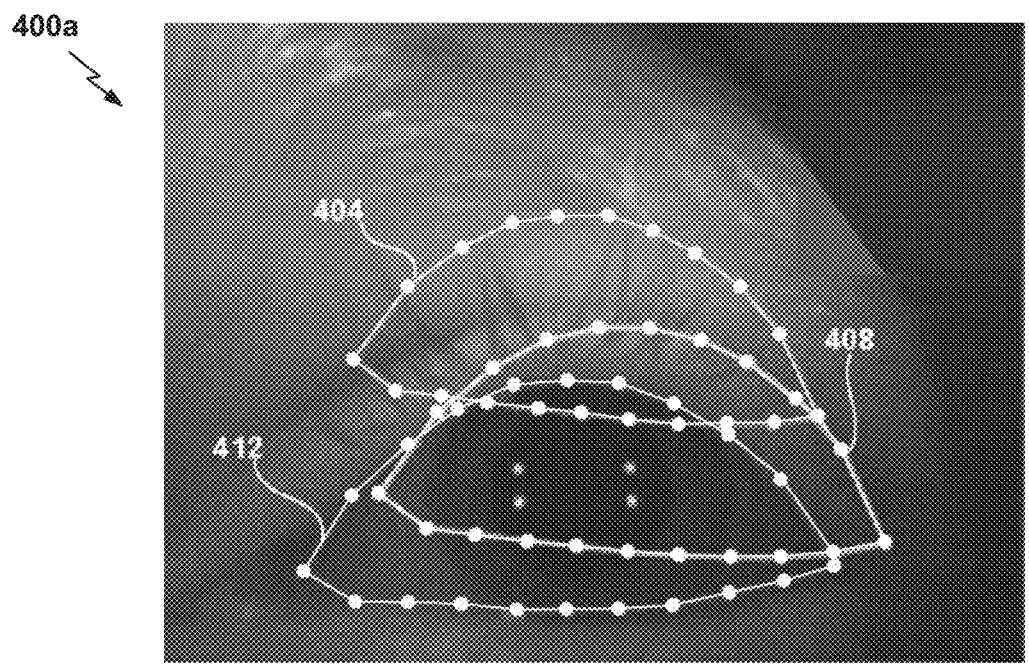
FIG. 4A schematically illustrates an example progression of a detailed eye shape model estimation.

FIG. 4A schematically illustrates an example progression of a detailed eye shape model. For simplicity, FIG. 4A only depicts the shape of an upper and lower eyelid 110a, 110b and does not illustrate the estimated shapes of an iris 112 or a pupil 114. However, the shapes of the iris 112 and the pupil 114 may additionally or alternatively be modeled at this stage (see, e.g., the example results in FIG. 4B). In some embodiments, the initial estimated eye shape 404 may be any eye shape that is similar to the target shape 412. For example, the initial estimated eye shape can be set as a mean shape in the center of the image. FIG. 4A depicts the eye shape regression from the initial estimated eye shape 404 to the target shape 412 performed over eleven stages. FIG. 4A shows the initial (zeroth) stage $S_0$, the first stage $S_1$, and the tenth stage $S_{10}$. For simplicity, only the intermediate eyelid shape 408 is depicted in FIG. 4A. In some embodiments, the regression model may be programmed to stop after a predetermined number of iterations (e.g., 5, 10, 20, 50, 100, or more). In other embodiments, the regression model may continue iterating until the shape increment $\Delta S_t$ at stage t is smaller than a threshold. For example, if the relative eye shape change $|\Delta S_t/S_t|$ is less than a threshold (e.g., $10^{-2}$, $10^{-3}$, or smaller), the regression model may terminate. In other embodiments, the regression model may continue iterating until the difference between the shape $S_t$ at stage t and the shape at the previous stage $S_{t-1}$ is smaller than a threshold.

In some embodiments, the detailed eye shape model 400b may comprise a plurality of boundary points 424 for the pupillary, limbic, or eyelid boundaries. The boundary points 424 may correspond to the estimated eyelid shape 412, the estimated iris shape 416, and the estimated pupil shape 420, respectively. The number of boundary points 424 can be in a range of 6-100 or more. In some implementations, the detailed eye shape model 400b can be used to determine whether a received eye image meets certain standards, e.g., quality of the image.

Figure 4B:
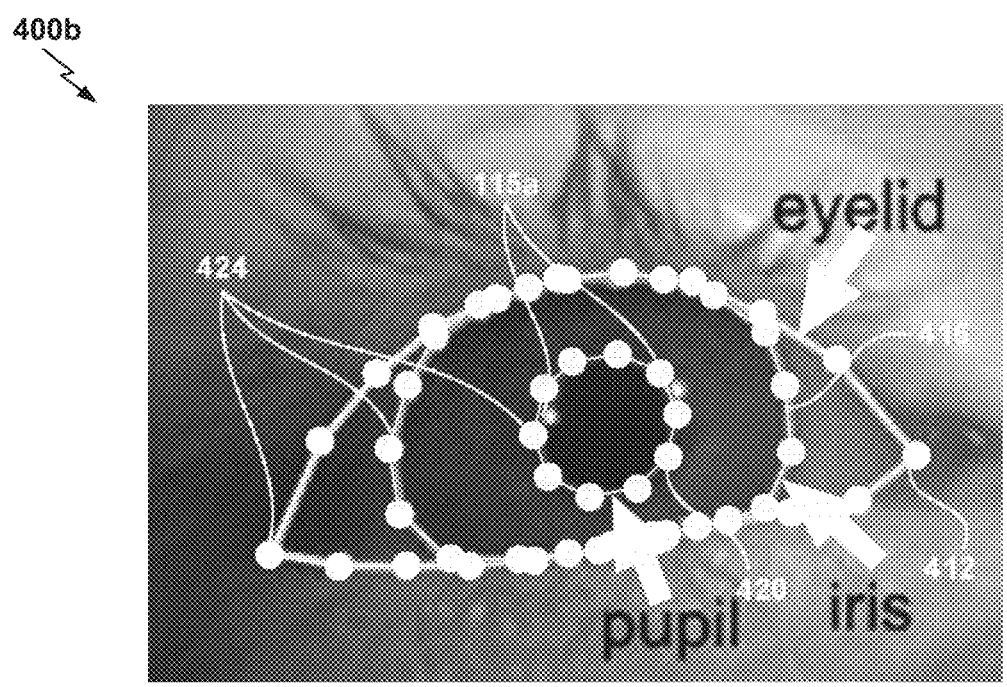
FIG. 4B schematically illustrates an example of a detailed eye shape model in which boundaries of the pupil, iris, and eyelid have been identified.
Figure 4C:
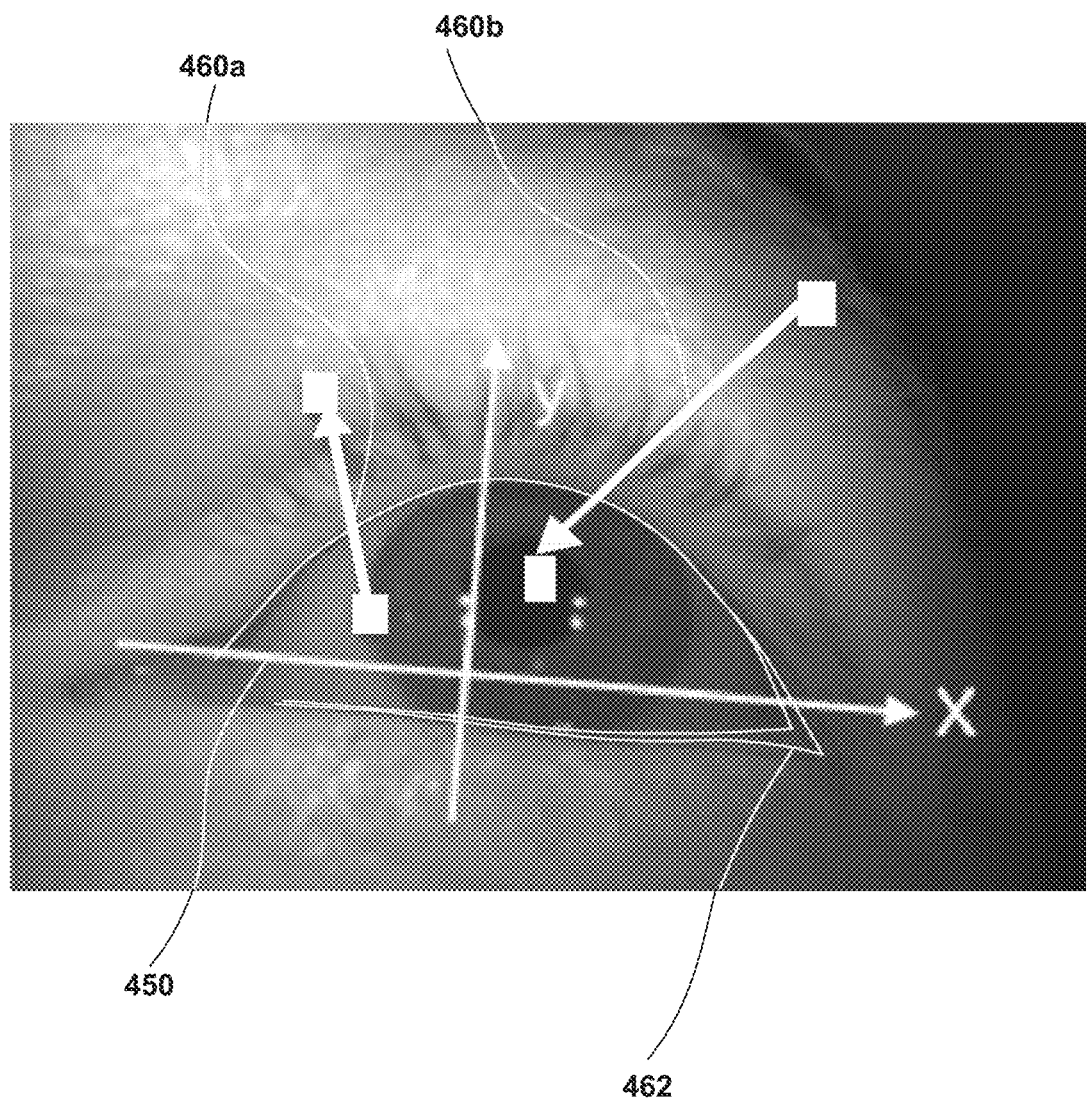
FIG. 4C is an image showing an example of two pairs of shape-indexed features.

FIG. 4B illustrates an example of a completed eye shape model using the eye shape estimation routine 300 described at block 312 of FIG. 3. FIG. 4B illustrates the result of block 312 after an eye shape is modeled based on cascaded shape regression that has determined the pupillary, limbic, and eyelid boundaries. These boundaries are overlaid on an image of the periocular region of the eye to show the match between the calculated boundaries and the underlying eye image. As described above, the shape-indexed extraction function $\Phi_t$ can handle larger shape variations compared to a "non-shape-indexed" feature. A pairwise pixel comparison feature may be used, which may be invariant to global illumination changes. FIG. 4C is an image showing an example of two pairs of shape-indexed features. A local coordinate system (shown as x and y axes 450) is determined by the current eye shape (e.g., the eyelid shape 462). Intensity values from a pair of pixel locations 460a, 460b (the squares connected by arrowed lines; two pair 460a, 460b of such pixel locations are shown) can be compared to provide a binary feature (e.g., a Boolean value such as 0 or 1, indicating a match or non-match). For example, a pixel located inside the pupil (e.g., the pupillary pixel in the pair 460b) may be darker in color or contrast than a pixel located outside the pupil (e.g., in the user's iris, sclera, or skin (as shown in FIG. 4C)). In some implementations, the pixel locations are fixed in the local coordinate system 450, which varies as the eye shape 462 is updated during the stages of the regression. In one example system, 2500 features are constructed from 400 pixel locations, all of which are learned from training data 500 (described below with reference to FIG. 5).

Example of Training Images for Learning Cascaded Shape Regression

Figure 5:
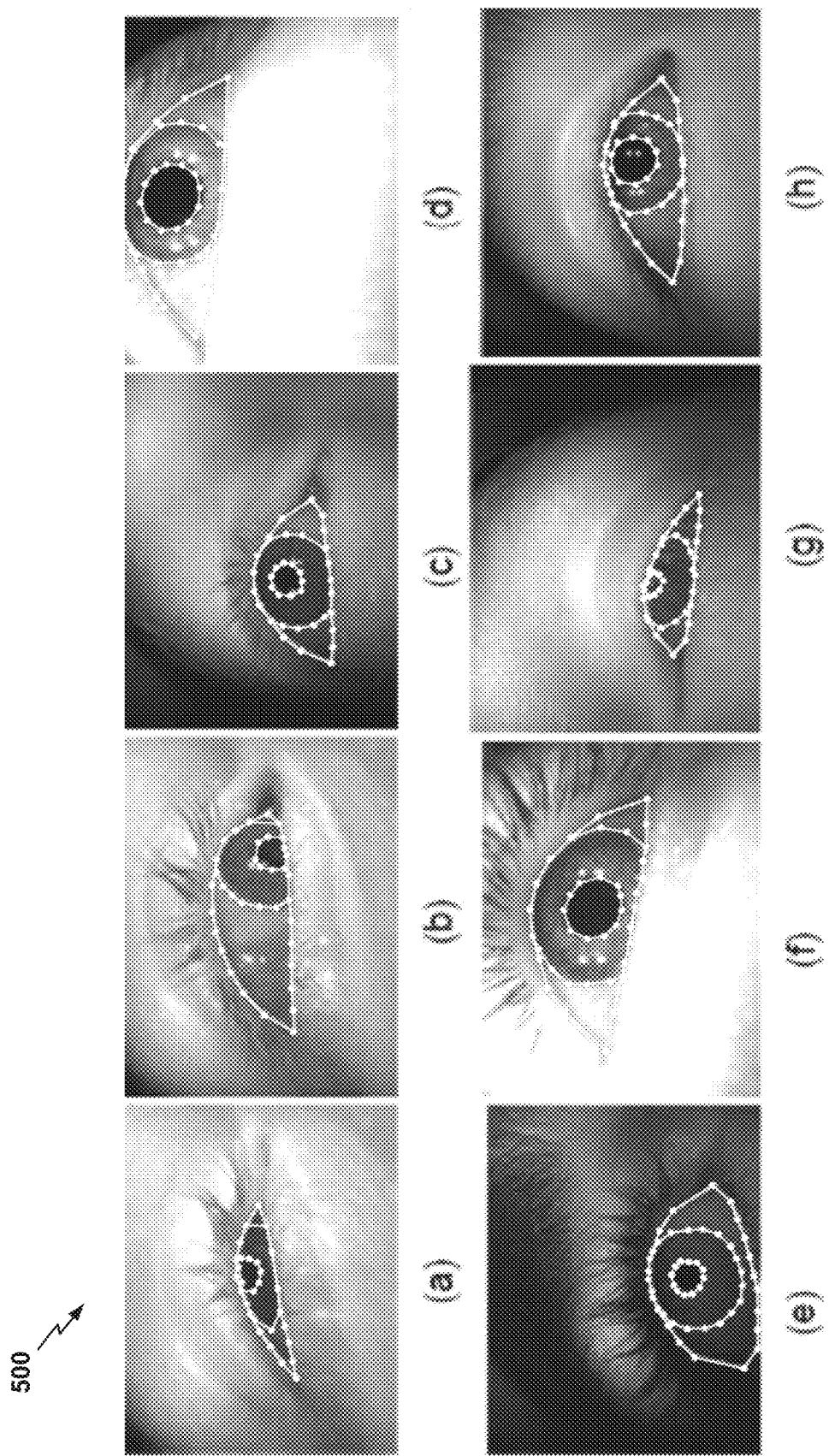
FIG. 5 illustrates an example of a set of annotated training images used for learning a regression function.

In some embodiments, the regression function $f_t$ and the shape-indexed extraction function $\Phi_t$ may be learned from sets of annotated (e.g., labeled) training data. FIG. 5 illustrates an example of training data 500 that includes eight example eye images from different subjects with large shape and appearance variations (indexed as (a) through (h)). The labeled eye images advantageously should show a wide range of eye variations (e.g., normally opened eyes, blinking eyes, eyes pointing in a wide range of directions (up, down, left, right) relative to a natural resting direction, etc.) from a wide range of subjects (of different genders, ethnicities, etc.).

The training data 500 are annotated to show the features that are to be learned, which in this example include pupillary, limbic, and eyelid boundaries marked on each of the images. These labeled boundaries in each of the images in the training data 500 can be determined using any appropriate pupillary, limbic, or eyelid boundary technique or by hand. Various machine learning algorithms may be used to learn the regression function $f_t$ and the shape-indexed extraction function $\Phi_t$ from the annotated training data 500. Supervised machine learning algorithms (e.g., regression-based algorithms) can be used to learn the regression function and shape-indexed extraction function from the annotated data 500. Some examples of machine learning algorithms that can be used to generate such a model can include regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), or other machine learning algorithms.

In some embodiments, a set of training images may be stored in the remote data repository 232. The remote processing module 228 may access the training images to learn the regression function $f_t$ and the shape-indexed extraction function $\Phi_t$. The local processing and data module 224 may then store the regression function $f_t$ and the shape-indexed extraction function $\Phi_t$ on the wearable device 200. This reduces the need for the local processing and data module 224 to perform the computationally intense process of learning the regression function $f_t$ and the shape-indexed extraction function $\Phi_t$. In some embodiments, biometric information may be taken from the user 204 and stored on the local processing and data module 224. The biometric information can then be used by the local processing and data module 224 (or the remote processing module 228) to further train the regression function and shape-indexed extraction function based on the user's personalized eye shape and features through, for example, unsupervised learning. Such training personalizes the regression model so that it more particularly matches the features of the user's eyes and periocular region, which can improve accuracy and efficiency.

Example Eye Shape Training Routine

Figure 6:
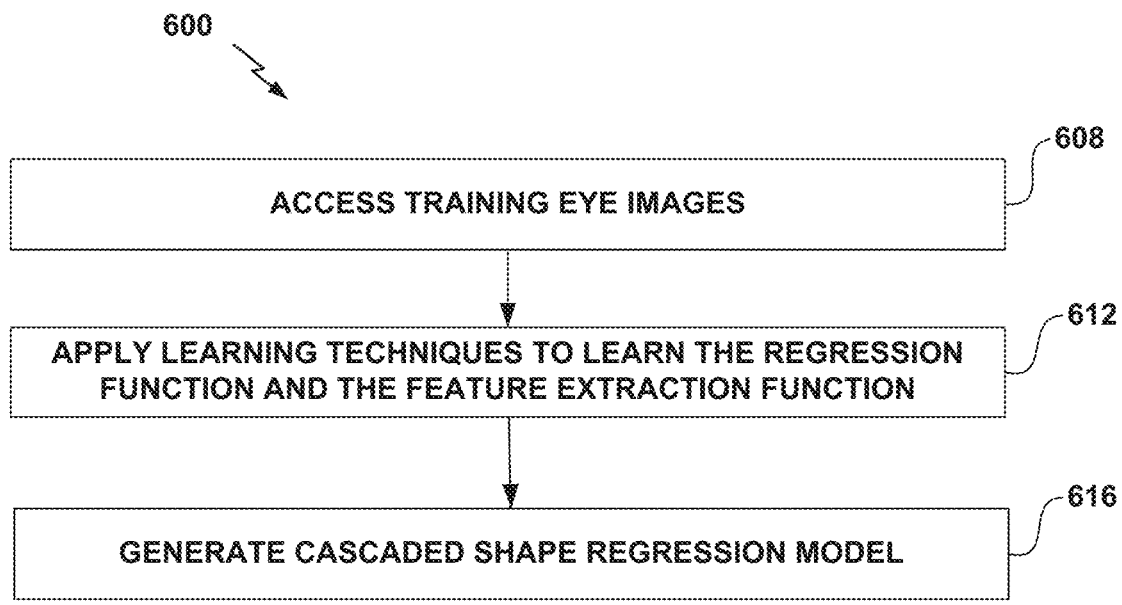
FIG. 6 is a flow diagram of an example of an eye shape training routine for learning cascaded shape regression.

FIG. 6 is a flow diagram of an example eye shape training routine 600, used to learn the regression function $f_t$ and the shape-indexed extraction function $\Phi_t$ from a set of training images (e.g., the images 500 shown in FIG. 5). The eye shape training routine 600 can be implemented by the processing modules 224, 228, 232. The routine 600 begins at block 608 when training data (e.g., the data 500) comprising annotated eye images are accessed. The training eye images can be accessed from a non-transitory data store, which stores annotated eye images. The processing module can access the non-transitory data store via wired or wireless techniques. At block 612, a machine learning technique (e.g., supervised learning for annotated or labeled images) is applied to learn the regression function $f_t$ and the shape-indexed extraction function $\Phi_t$. A cascaded shape regression model can then be generated at block 616. This regression model enables routine 300 to estimate the detailed eye shape model at block 312. As described above, the cascaded shape regression model can be personalized to a particular user by further training the regression function and shape-indexed extraction function on eye images of the user obtained by the wearable display system 200 during use.

Example of Robust Feature Detection

Eyelid Occlusion of Pupil or Iris

Figure 7A:
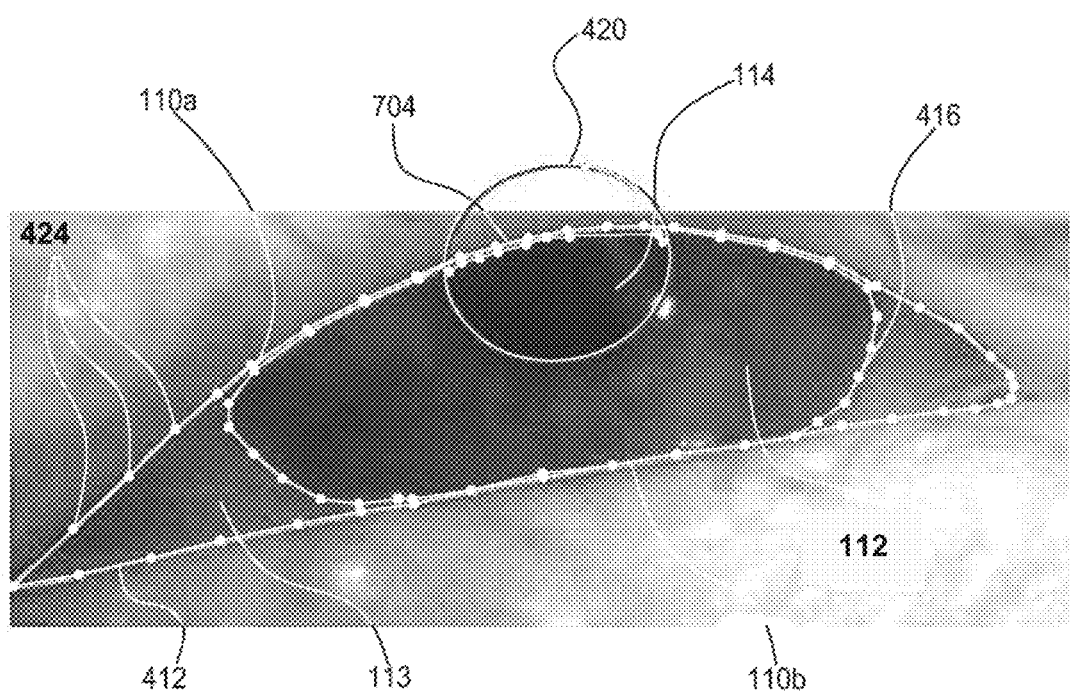
FIG. 7A schematically illustrates an example of false boundary points.

FIG. 7A illustrates boundary points 424 of a pupil that is partially occluded by the eyelids. In one embodiment for robust feature detection using a detailed eye shape model, pupil detection may be improved by removing false pupil boundary points 704 (shown as the arc of boundary points along the upper eyelid 110a and within the pupil boundary 420). False pupil boundary points 704 may be created when an eyelid partially occludes the pupil as shown in FIG. 7A (where the upper eyelid 110a partially occludes the pupil 114). The points 704 therefore reflect the position of the eyelid rather than the true boundary of the pupil (which is occluded by the eyelid). Rather than include the false boundary points 704, which may lead to generation of an inaccurate model of the pupil, the false boundary points 704 may be identified and removed before a pupil boundary-finding method is performed. In some embodiments, the false pupil boundary points 704 may be any pupil boundary point that is located within a certain distance of the upper or lower eyelid. In some embodiments, the false pupil boundary points 704 may be any pupil boundary point that borders the upper or lower eyelid. In some embodiments, once the false pupil boundary points 704 are identified and removed, an ellipse may be fitted to the pupil using the remaining pupil boundary points. Algorithms that may be implemented for such an ellipse fitting include: integro-differential operators, least-squares method, random sample consensus (RANSAC), or an ellipse or curve fitting algorithm.

Note, while the above embodiments specifically reference false pupil boundary points, the techniques described above may also be applied to identify and remove false limbic boundary points.

In some embodiments, a detailed eye shape model may be used in conjunction with a pupil boundary finding algorithm such as, e.g., the starburst algorithm, which can be employed to detect many pupil boundary points. Using the eyelid shapes 412 of the detailed eye shape model, the boundary points determined using the starburst algorithm that border upper or lower eyelids 110a, 110b are removed, and the remaining boundary points are used to fit a pupil boundary 420. In some embodiments, the limbic boundary points that border the sclera 113 may also be identified using the detailed eye shape model. Thereafter, the iris ellipse 416 is fit using only the limbic boundary points determined to border the sclera 113. Similarly, the pupil boundary 420 may be fit using only the pupil boundary points determined to border the iris 112. In some embodiments, the detailed eye shape model may improve the robustness of the pupil boundary-finding algorithm by providing a better initial "best guess" of the pupil center based on the detailed eye shape model.

Glint Detection

Figure 7B:
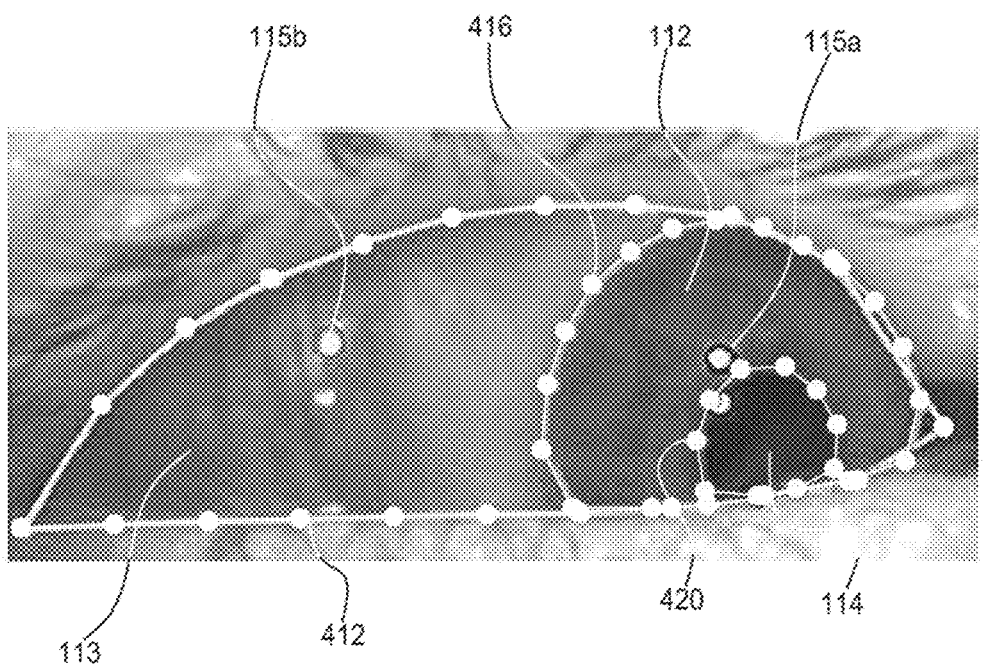
FIG. 7B schematically illustrates an example of selective feature detection.

In conventional gaze estimation, the pupil boundary (e.g., an ellipse in some techniques) and glints are detected by searching the entire eye image. Given the detailed eye shape model described herein, feature detection can be faster and more efficient by eliminating the need to search the entire eye for features. In some embodiments, by first identifying the different regions of the eye (e.g., sclera, pupil, or iris) the detailed eye shape model may allow feature detection in particular regions of the eye (e.g., selective feature detection). FIG. 7B illustrates an example of selective feature detection. Glints 115a, 115b may appear in the sclera 113, the iris 112, or the pupil 114. In certain biometric applications, it may be necessary or desirable to identify glints 115a, 115b in certain regions of the eye (e.g., the iris, which represent corneal reflections) while ignoring glints 115a, 115b outside of those regions (e.g., the sclera). For instance, when determining gaze in certain techniques, scleral glints 115b, located in the sclera 113, do not represent the reflection of the light source from the cornea, and their inclusion in the gaze technique leads to inaccuracies in the estimated gaze. Therefore, it may be advantageous to use a detailed eye shape model to search for and identify iris glints 115a located within the iris 112 or within the limbic boundary 416. As illustrated in FIG. 7B, iris glints 115a are within the iris 112 and therefore may be preferred for gaze estimation. On the other hand, the scleral glints 115b appear in the sclera 113 and therefore may not be preferred for gaze estimation. Accordingly, embodiments of the techniques disclosed herein can be used to identify the eye regions where glints are likely to occur and eye regions outside these regions do not need to be searched, which improves the accuracy, speed, and efficiency of the technique.

Blink Detection

In some embodiments, feature detection can be more robust and efficient by using a detailed eye shape model to determine whether a received eye image meets certain quality thresholds. For instance, the detailed eye shape model may be used to determine whether the eye is sufficiently open to estimate a reliable eye shape and to extract features and to perform a biometric application (e.g., gaze finding or biometric authentication/identification). In some embodiments, if the distance between the upper eyelid 110*a* and the lower eyelid 110*b* is less than a threshold, the eye image is considered unusable and is discarded, and accordingly no features are extracted for biometric application. In some embodiments, the eye image may be rejected if the upper eyelid 110*a* and the lower eyelid 110*b* are separated by no more than 5 mm. In another embodiment, the eye image may be rejected if greater than a certain percentage of the pupil 114 or iris 112 is occluded by one or more of the eyelids 110*a*, 110*b* (e.g., greater than 40%, 50%, 60%, 75%, or more). In another embodiment, the eye image may be rejected if a number of pupil boundary points 704 border the upper eyelid 110*a* or lower eyelid 110*b*. For instance, if roughly half of the pupil boundary points 704 border an eyelid 110*a*, 110*b*, it may be concluded that roughly half of the pupil 114 is occluded by the eyelid, and thus, the eye image is unsuitable for biometric applications. In other embodiments, rather than rejecting and discarding the eye image, the eye image is assigned a lower weight in a biometric application than eye images in which there is less occlusion of the eye (e.g., images where the distance between the upper eyelid 110*a* and the lower eyelid 110*b* is greater than the threshold).

Additional Aspects

In a first aspect, a wearable display system comprising: a light source configured to illuminate an eye of a user; an image capture device configured to capture an eye image of the eye; non-transitory memory configured to store the eye image; and a hardware processor in communication with the non-transitory memory, the hardware processor programmed to: receive the eye image from the non-transitory memory; estimate an eye shape from the eye image using cascaded shape regression, the eye shape comprising a pupil shape, an iris shape, or an eyelid shape; and perform a biometric application based at least in part on the eye shape.

In a second aspect, the wearable display system of aspect 1, wherein the light source comprises an infrared light source.

In a third aspect, the wearable display system of aspect 1 or aspect 2, wherein the hardware processor is further programmed to determine an eye feature based at least in part on the eye shape.

In a fourth aspect, the wearable display system of aspect 3, wherein the eye feature comprises at least one of a glint (e.g., from the light source), a blood vessel, an iris feature, or a center of the pupil.

In a fifth aspect, the wearable display system of any one of aspects 1 to 4, wherein the biometric application comprises determination of eye gaze.

In a sixth aspect, the wearable display system of aspect 5, wherein the eye shape comprises the iris shape, and the hardware processor is programmed to search for glints (e.g., from the light source) that are within the iris shape.

In a seventh aspect, the wearable display system of any one of aspects 1 to 6, wherein the eye shape comprises the pupil shape and the eyelid shape, and the hardware processor is programmed to identify a portion of the pupil that is occluded by the eyelid.

In an eighth aspect, the wearable display system of aspect 7, wherein the hardware processor is programmed to determine a pupillary boundary based on the pupil shape without the portion of the pupil that is occluded by the eyelid.

In a ninth aspect, the wearable display system of any one of aspects 1 to 8, wherein the eye shape comprises the iris shape and the eyelid shape, and the hardware processor is programmed to identify a portion of the iris that is occluded by the eyelid.

In a 10th aspect, the wearable display system of aspect 9, wherein the hardware processor is programmed to determine a limbic boundary based on the iris shape without the portion of the iris that is occluded by the eyelid.

In an 11th aspect, the wearable display system of any one of aspects 1 to 10, wherein eye shape comprises the eyelid shape, and the biometric application comprises determination of eye blink.

In a 12th aspect, the wearable display system of aspect 11, wherein the hardware processor is programmed to reject or assign a lower weight to the eye image if a distance between an upper eyelid and a lower eyelid is less than a threshold.

In a 13th aspect, the wearable display system of any one of aspects 1 to 12, wherein the eye shape comprises a boundary to a pupil, an iris, or an eyelid.

In a 14th aspect, the wearable display system of aspect 13, wherein the boundary comprises a plurality of boundary points.

In a 15th aspect, the wearable display system of any one of aspects 1 to 14, wherein the biometric application comprises biometric identification or biometric authentication.

In a 16th aspect, the wearable display system of any one of aspects 1 to 15, wherein the hardware processor is programmed to fit a curve to a boundary of the pupil, iris, or eyelid.

In a 17th aspect, the wearable display system of any one of aspects 1 to 16, wherein to estimate the eye shape from the eye image using cascaded shape regression, the hardware processor is programmed to: iterate a regression function for determining a shape increment over a plurality of stages, the regression function comprising a shape-indexed extraction function.

In an 18th aspect, the wearable display system of aspect 17, wherein to iterate the regression function, the hardware processor is programmed to evaluate $$\Delta S_t = f_t(\Phi_t(I, S_{t-1})),$$

for a shape increment $\Delta S_t$ at stage t of the iteration, where $f_t$ is the regression function at stage t, $\Phi_t$ is the shape-indexed extraction function at stage t, I is the eye image, and $S_{t-1}$ is the eye shape at stage t−1 of the iteration.

In a 19th aspect, the wearable display system of aspect 17 or aspect 18, wherein the shape-indexed extraction function provides a comparison of eye image values between a pair of pixel locations.

In a 20th aspect, a method for processing an eye image, the method comprising: under control of a hardware processor: receiving the eye image; estimating an eye shape using cascaded shape regression; determining eye features using the eye shape; and performing a biometric application using the eye features.

In a 21st aspect, the method of aspect 20, wherein performing the biometric application comprises performing biometric identification.

In a 22nd aspect, the method of aspect 20 or aspect 21, wherein performing the biometric application comprises eye gaze determination.

In a 23rd aspect, the method of any one of aspects 20 to 22, wherein estimating the eye shape comprises estimating at least one of an eyelid shape, an iris shape, or a pupil shape.

In a 24th aspect, the method of any one of aspects 20 to 23, wherein, after estimating the eye shape, the hardware processor is configured to reject an unsuitable eye image.

In a 25th aspect, the method of any one of aspects 20 to 24, wherein estimating the eye shape using cascaded shape regression comprises iterating a regression function that comprises a shape-indexed extraction function.

In a 26th aspect, a method for training an eye shape calculation engine, the method comprising: under control of a hardware processor: receiving a set of annotated training eye images, wherein each image in the set is labeled with an eye shape; and using a machine learning technique applied to the set of annotated training eye images to learn a regression function and a shape-indexed extraction function, where the regression function and the shape-indexed extraction function learn to recognize the eye shape.

In a 27th aspect, the method of aspect 26, wherein the eye shape comprises a shape of a pupil, a shape of an iris, or a shape of an eyelid.

In a 28th aspect, the method of aspect 26 or aspect 27, wherein the regression function and the shape-indexed extraction function are learned to recognize eye shape according to an iteration of $$\Delta S_t = f_t(\Phi_t(I, S_{t-1})),$$

for a shape increment $\Delta S_t$ at stage t of the iteration, where $f_t$ is the regression function at stage t, $\Phi_t$ is the shape-indexed extraction function at stage t, I is an unlabeled eye image, and $S_{t-1}$ is the eye shape at stage t−1 of the iteration.

In a 29th aspect, the method of aspect 28, wherein the shape-indexed extraction function provides a comparison of eye image values between a pair of pixel locations.

In a 30th aspect, the method of aspect 29, wherein the comparison comprises a binary or Boolean value.

Additional Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task, eye shape model, or biometric application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A wearable display system comprising:
    an infrared light source configured to illuminate an eye of a user;
    an image capture device configured to capture an eye image of the eye;
    non-transitory memory configured to store the eye image; and
    a hardware processor in communication with the non-transitory memory, the hardware processor programmed to:
        access the eye image from the non-transitory memory;
        estimate an eye shape from the eye image using cascaded shape regression by iterating a shape-indexed extraction function over a plurality of stages, the shape-indexed extraction function being dependent on at least the eye image and the eye shape determined for a previous stage of the plurality of stages, the eye shape comprising a pupil shape, an iris shape, or an eyelid shape; and
        perform a biometric application based at least in part on the eye shape, wherein performing the biometric application comprises at least searching for glints based at least in part on the eye shape.

2. The wearable display system of claim 1, wherein the hardware processor is further programmed to determine an eye feature based at least in part on the eye shape, wherein the eye feature comprises at least one of a glint from the infrared light source, a blood vessel, an iris feature, or a center of the pupil.

3. The wearable display system of claim 1, wherein the biometric application comprises determination of eye gaze.

4. The wearable display system of claim 3, wherein the eye shape comprises the iris shape, and the hardware processor is programmed to search for glints from the infrared light source that are within the iris shape.

5. The wearable display system of claim 1, wherein the eye shape comprises the pupil shape and the eyelid shape, and the hardware processor is programmed to identify a portion of the pupil that is occluded by the eyelid.

6. The wearable display system of claim 5, wherein the hardware processor is programmed to determine a pupillary boundary based on the pupil shape without the portion of the pupil that is occluded by the eyelid.

7. The wearable display system of claim 1, wherein the eye shape comprises the iris shape and the eyelid shape, and the hardware processor is programmed to identify a portion of the iris that is occluded by the eyelid.

8. The wearable display system of claim 7, wherein the hardware processor is programmed to determine a limbic boundary based on the iris shape without the portion of the iris that is occluded by the eyelid.

9. The wearable display system of claim 1, wherein eye shape comprises the eyelid shape, and the biometric application comprises determination of eye blink.

10. The wearable display system of claim 9, wherein the hardware processor is programmed to reject or assign a lower weight to the eye image if a distance between an upper eyelid and a lower eyelid is less than a threshold.

11. The wearable display system of claim 1, wherein the eye shape comprises a boundary to a pupil, an iris, or an eyelid.

12. The wearable display system of claim 1, wherein the biometric application comprises biometric identification or biometric authentication.

13. The wearable display system of claim 1, wherein the hardware processor is programmed to stop iterating the shape-indexed extraction function after a predetermined number of iterations or when the shape increment is smaller than a predetermined threshold.

14. The wearable display system of claim 1, wherein the shape-indexed extraction function determines a shape increment.

15. The wearable display system of claim 1, wherein the shape-indexed extraction function provides a comparison of eye image values between a pair of pixel locations.

16. A method for training an eye shape calculation engine, the method comprising:

under control of a hardware processor:

receiving a set of annotated training eye images, wherein each image in the set is labeled with an eye shape; and using a machine learning technique applied to the set of annotated training eye images to learn a regression function and a shape-indexed extraction function over a plurality of stages, the shape-indexed extraction function being dependent on at least an unlabeled eye image and an eye shape determined for a previous stage of the plurality of stages, where the regression function and the shape-indexed extraction function learn to recognize the eye shape, wherein the eye shape comprises a shape of a pupil, a shape of an iris, and a shape of an eyelid.

17. The method of claim 16, wherein the regression function and the shape-indexed extraction function determine a shape increment.

18. The method of claim 16, wherein the shape-indexed extraction function provides a comparison of eye image values between a pair of pixel locations.

19. The method of claim 18, wherein the comparison comprises a binary or Boolean value.

20. A wearable display system comprising:

an infrared light source configured to illuminate an eye of a user;

an image capture device configured to capture an eye image of the eye;

non-transitory memory configured to store the eye image; and a hardware processor in communication with the non-transitory memory, the hardware processor programmed to:

access the eye image from the non-transitory memory;

estimate an eye shape from the eye image using cascaded shape regression by iterating a shape-indexed extraction function over a plurality of stages, the shape-indexed extraction function being dependent on at least the eye image and the eye shape determined for a previous stage of the plurality of stages, the eye shape comprising a pupil shape, an iris shape, or and an eyelid shape; and perform a biometric application based at least in part on the eye shape.

* * * * *